United States Patent
Liu et al.

(10) Patent No.: US 10,621,295 B2
(45) Date of Patent: Apr. 14, 2020

(54) INCORPORATION OF PROCESS VARIATION CONTOURS IN DESIGN RULE AND RISK ESTIMATION ASPECTS OF DESIGN FOR MANUFACTURABILITY TO INCREASE FABRICATION YIELD

(71) Applicant: International Business Machines Corporation, Armonk, NY (US)

(72) Inventors: Jinning Liu, Andover, MA (US); Jing Sha, White Plains, NY (US); Robert Wong, Poughkeepsie, NY (US); Dongbing Shao, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 15/949,861

(22) Filed: Apr. 10, 2018

(65) Prior Publication Data

US 2019/0311071 A1  Oct. 10, 2019

(51) Int. Cl.
*G06F 17/50*  (2006.01)
*G06F 17/18*  (2006.01)
*G06F 7/58*  (2006.01)

(52) U.S. Cl.
CPC ............ *G06F 17/504* (2013.01); *G06F 7/58* (2013.01); *G06F 17/18* (2013.01);
(Continued)

(58) Field of Classification Search
CPC ...... G06F 17/504; G06F 17/5045; G06F 7/58; G06F 17/18; G06F 2217/06;
(Continued)

(56) References Cited

U.S. PATENT DOCUMENTS 6,553,558 B2   4/2003  Palmer et al.
7,624,369 B2   11/2009  Graur et al.
(Continued)

OTHER PUBLICATIONS

List of IBM Patents or Patent Applications Treated as Related; (Appendix P), Filed Apr. 10, 2018; 2 pages.
(Continued)

*Primary Examiner* — Vuthe Siek
(74) *Attorney, Agent, or Firm* — Cantor Colburn LLP; Erik Johnson

(57) ABSTRACT

A system and method to perform risk assessment or design rule determination for an integrated circuit involves generating two or more process variation contours based on corresponding two or more combinations of two or more factors that affect manufacturability of the integrated circuit. Each of the two or more process variation contours is associated with a probability. The method also includes generating a random number to select from among the two or more process variation contours based on a cumulative probability value associated with each of the two or more process variation contours. The cumulative probability values are determined from the probabilities. The risk assessment or the design rule determination is performed using selected ones of the two or more process variation contours. Fabrication yield is increased based on finalizing the physical layout using the process variation contours.

17 Claims, 7 Drawing Sheets

(52) U.S. Cl.
CPC ...... *G06F 17/5045* (2013.01); *G06F 2217/02* (2013.01); *G06F 2217/06* (2013.01); *G06F 2217/12* (2013.01); *G06F 2217/16* (2013.01)

(58) Field of Classification Search
CPC ............. G06F 2217/16; G06F 2217/02; G06F 2217/12; G06F 17/50
See application file for complete search history.

(56) References Cited

U.S. PATENT DOCUMENTS

| | | | |
|---|---|---|---|
| 7,752,584 | B2 | 7/2010 | Yang |
| 7,784,018 | B2 | 8/2010 | Melvin, III et al. |
| 7,861,195 | B2 | 12/2010 | Chan et al. |
| 8,020,120 | B2 | 9/2011 | Heng et al. |
| 8,141,008 | B2 | 3/2012 | Zach |
| 8,321,818 | B2 | 11/2012 | Agarwal et al. |
| 8,365,108 | B2 | 1/2013 | Baum et al. |
| 8,701,055 | B1 | 4/2014 | Lee et al. |
| 8,751,979 | B1 | 6/2014 | Socha |
| 8,799,830 | B2 | 8/2014 | Robles |
| 9,081,919 | B2 | 7/2015 | Dai et al. |
| 9,361,424 | B2 | 6/2016 | Robles |
| 9,651,856 | B2 | 5/2017 | Inoue et al. |
| 2005/0149902 | A1 | 7/2005 | Shi |
| 2005/0210437 | A1 | 9/2005 | Shi |
| 2005/0251771 | A1* | 11/2005 | Robles ................ G06F 17/5022 716/52 |
| 2006/0218516 | A1 | 9/2006 | Mclain et al. |
| 2010/0203430 | A1 | 8/2010 | Ye |
| 2011/0173577 | A1 | 7/2011 | Chuang et al. |
| 2013/0139116 | A1 | 5/2013 | Chow |
| 2015/0089459 | A1 | 3/2015 | Liu |
| 2015/0339426 | A1 | 11/2015 | Nifong et al. |
| 2016/0378902 | A1 | 12/2016 | Graur |
| 2019/0072845 | A1 | 3/2019 | Lin et al. |
| 2019/0072846 | A1 | 3/2019 | Lin et al. |

OTHER PUBLICATIONS

Chieh-Yu Lin et al., "Semiconductor Fabrication Design Rule Loophole Checking for Design for Manufacturability Optimization", U.S. Appl. No. 15/696,505, filed Sep. 6, 2017.
Chieh-Yu Lin et al., "Semiconductor Fabrication Design Rule Loophole Checking for Design for Manufacturability Optimization", U.S. Appl. No. 15/819,213, filed Nov. 21, 2017.
Chieh-Yu Lin et al., "Semiconductor Fabrication Design Rule Loophole Checking for Design for Manufacturability Optimization", U.S. Appl. No. 16/441,911, filed Jun. 14, 2019.
Fu et al., "DFM Viewpoints of Cell-level Layout Assessments and Indications for Concurrent Layout Optimization," Proc. SPIE 7122, Photomask Technology 2008, 71221Z, Oct. 17, 2008, pp. 1-8.
Kim et al., "Model-based Hot Spot Fixing by using Target Point Control Function," Proc. SPIE 9426, Optical Microlithography XXVIII, 94261X, Mar. 18, 2015, pp. 1-7.
List of IBM Patents or Patent Applications Treated as Related; (Appendix P), Filed Sep. 12, 2019; 2 pages.
Yang et al., "A Kernel-Based DfM model for Process from Layout toWwafer," Proc. SPIE 7641, Design for Manufacturability through Design-Process Integration IV, 76410O, Apr. 2, 2010, pp. 1-8.
Yang et al., "OPC Solution by Implementing Fast Converging Methodology," Proc. SPIE 9426, Optical Microlithography XXVIII, 94261V Mar. 18, 2015, pp. 1-8.

\* cited by examiner

| entry | F | D | MB | P (%) | CP (%) |
|---|---|---|---|---|---|
| 1 | f1 – f1% | d1 – d1% | mb1 – mb1% | 0.01 | 0.01 |
| 2 | f2 – f2% | d2 – d2% | mb2 – mb2% | 0.05 | 0.06 |
| 3 | f3 – f3% | d3 – d3% | mb3 – mb3% | 1 | 1.06 |
| 4 | f4 – f4% | d4 – d4% | mb4 – mb4% | 0.05 | 1.11 |
| ... | | | | | |
| n | fn – fn% | dn – dn% | mbn – mbn% | 0.01 | 100 |

| focus value (F) (micrometer) | probability ($P_F$) (percentage) |
|---|---|
| -60 | 1 |
| -40 | 6 |
| -20 | 26 |
| 0 | 38 |
| 20 | 24 |
| 40 | 6 |
| 60 | 1 |

INCORPORATION OF PROCESS VARIATION CONTOURS IN DESIGN RULE AND RISK ESTIMATION ASPECTS OF DESIGN FOR MANUFACTURABILITY TO INCREASE FABRICATION YIELD

BACKGROUND

The present invention relates to the manufacture of integrated circuits (ICs), and more specifically, to the incorporation of process variation contours in design rule and risk estimation aspects of design for manufacturability to increase fabrication yield.

Integrated circuits are typically fabricated by optical lithographic techniques. Energy beams transmit integrated circuit images, patterns, or photomasks (or masks or reticles) to photosensitive resists on semiconductor wafer substrates, formed (or printed or transferred) as multiple layers of patterned materials overlaid on the substrate. For each patterned layer formed on the substrate, there may be one or more masks used to form the printed patterns on the wafer. The patterns are typically expressed as polygons on the masks. However, due to a variety of optical effects, the polygons of the mask transferred to or imaged on the wafer will be smoothed and distorted during the lithographic process of transferring the mask patterns to the wafer because of a variety of optical effects. Design rules, also referred to as ground rules, establish geometric constraints or recommendations on the physical layout of an IC. Design rule checking (DRC) is the process of determining whether the physical layout of a given IC satisfies the corresponding design rules. The design rules reflect the risk of manufacturing a failed device, and passing the DRC can ensure a higher yield.

SUMMARY

Embodiments of the present invention are directed to systems and methods to perform risk assessment or design rule determination for an integrated circuit. A method includes generating two or more process variation contours based on corresponding two or more combinations of two or more factors that affect manufacturability of the integrated circuit. Each of the two or more process variation contours is associated with a probability. The method also includes generating a random number to select from among the two or more process variation contours based on a cumulative probability value associated with each of the two or more process variation contours. The cumulative probability values are determined from the probabilities. The risk assessment or the design rule determination is performed using selected ones of the two or more process variation contours.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

FIG. 3 is a table showing exemplary factor values and corresponding probabilities according to embodiments of the invention;

FIG. 4 is a table showing n combinations of factor values that result in process variation contours according to embodiments of the invention;

DETAILED DESCRIPTION

Figure 1:
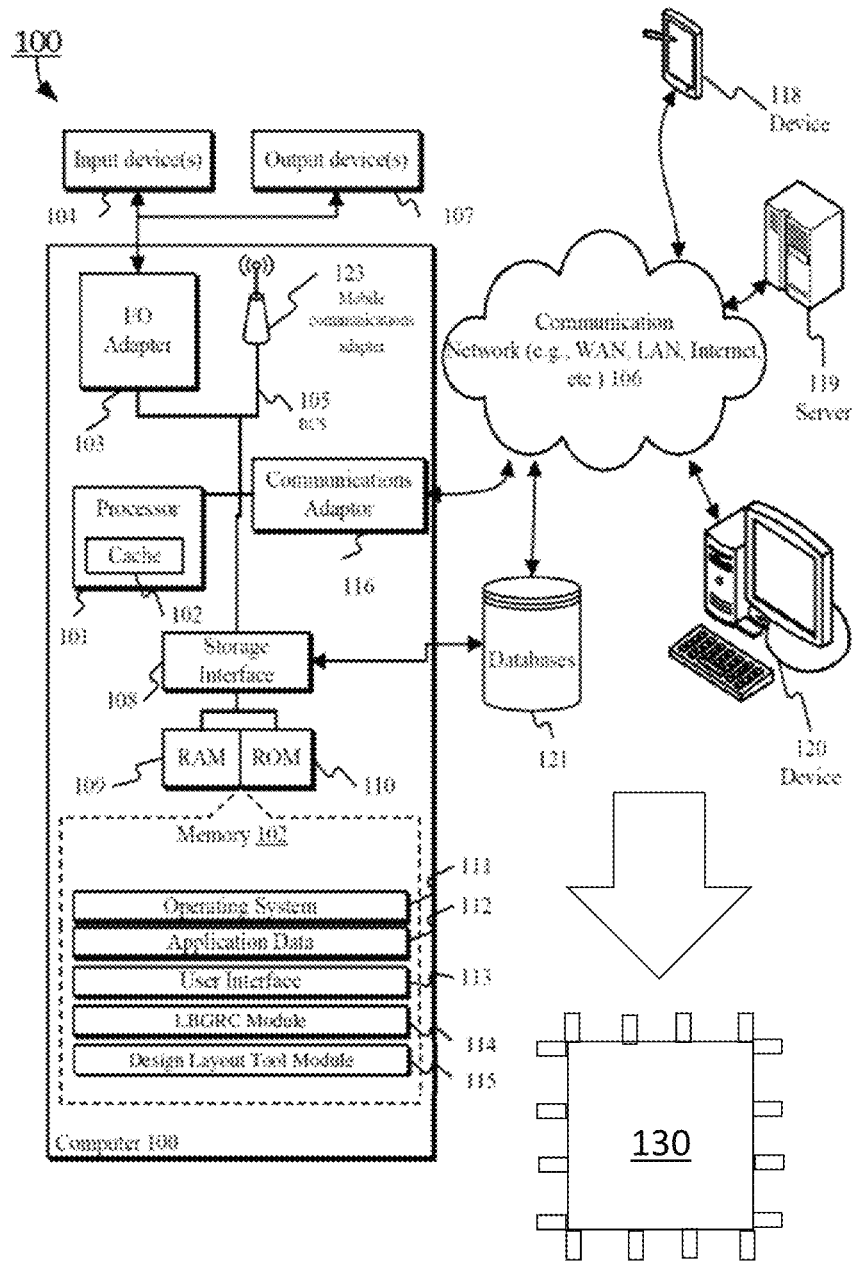
FIG. 1 is a block diagram of an exemplary system used to perform processes according to one or more embodiments of the invention.

As previously noted, design rules or grounds rules establish geometric tolerances and constraints on the physical layout of an IC. Design rules can be intra-level and inter-level rules. Inter-level (i.e., inter-layer) design rule calculations are of interest herein, because they address a specific underlying risk due to process integration flow. The design rules are maintained and released by a semiconductor foundry for use by its customers (e.g., layout designers of ICs). Fabricators who ultimately produce the physical ICs may insist on the use of restrictive design rules, because yields may be increased by adhering to the design rules. Once design rules are established for a given IC, the DRC may be performed as a part of physical verification signoff on the design. Physical verification may additionally include layout versus schematic (LVS) checks, exclusive OR (XOR) checks, electrical rule checks (ERC) and antenna checks.

Conventional design rule calculation is one-dimensional (i.e., variation is in one dimension only) and relies on process assumptions. An exemplary design rule determined using the conventional approach may assume a 10 nanometer variation in a shape in a first mask, a 5 nanometer variation in a shape in a second mask, and an overlay error of 2 nanometers. The resulting design rule may be that the two shapes cannot be closer than 8 nanometers. The design rule assumes that the design target is met and variations are within the process assumption. The process assumptions and target values are used to determine defect rate in a Monte-Carlo style simulation, and this determination is used to generate design rules. That is, for each iteration, a possible outcome within the process assumptions (e.g., 10 nanometer variation in a shape on a first mask) is selected. Variations in the individual factors (e.g., focus, dose) are not considered but, instead, a possible overall outcome is considered by the process assumptions. Each iteration results in a possible pseudo wafer contour to be used in risk calculation in a Monte-Carlo fashion. These selected design variations are used to estimate the risk of failure and to establish the design rule to mitigate failure. However, this approach may be too simplistic for a real design or a complex design shape.

The issues of using the conventional design rule determination are exacerbated in the process of fabricating static random-access memory (SRAM). This is because the two-dimensional features of the SRAM design (e.g., corners, jogs, line ends) cause severe deviation from the design target. A design rule developed using process assumptions for a logic design may be significantly off for a SRAM design, and a design rule developed using process assumptions associated with one SRAM cell may not apply to a slightly different design style in a different SRAM cell.

Embodiments of the systems and methods detailed herein relate to the incorporation of process variation contours in design rule calculation and risk estimation to increase fabrication yield. Process variation contours differ from the pseudo wafer contours, which are previously discussed as being based on the process assumptions. Specifically, probabilities are used to weight discretized process conditions. Generally, the process flow described for conventional design rule calculation (generating process variations and selecting from among them using Monte Carlo simulations) is followed. However, process variation contours, which consider the probability of each variation in each factor, are used instead of pseudo wafer contours that are based on process assumptions. As a result, defect rate is determined using process variation contours, which take into account real process details and nuances, rather than using pseudo wafer contours that are based on process assumptions. Process variation contours are determined from process variation simulations that account for the probability of each variation in a factor along with its value. The process variation contours are determined for different layers. Thus, as previously noted, inter-layer two-dimensional design rules and risk associated with overlay errors may be determined from the embodiments of the invention.

The various processes involved in fabricating an integrated circuit on a wafer are well-known and only generally described with reference to FIG. 8. Once the layout of components that make up the integrated circuit is finalized based on the risk assessment and design rules facilitated by the process variation contours, known processes are used to fabricate the integrated circuit. Specifically, the foundry is provided with the finalized layout in a process referred to as tapeout. Mask shapes are then generated and used to fabricate the integrated circuit. Embodiments of the invention pertain to improvements over the state of the art with regard to the information (process variation contours) used to facilitate risk assessment and the development of design rules in order to finalize the layout.

FIG. 1 is a block diagram of an exemplary system 100 used to perform processes according to one or more embodiments of the invention. The processes can be implemented in hardware, software (e.g., firmware), or a combination thereof. In an exemplary embodiment, the processes described herein are implemented in hardware and may be part of the microprocessor of a special or general-purpose digital computer, such as a personal computer, workstation, minicomputer, or mainframe computer. System 100 therefore can embody a general-purpose computer. In another exemplary embodiment, the methods described herein are implemented as part of a mobile device, such as, for example, a mobile phone, a personal data assistant (PDA), or a tablet computer.

In an exemplary embodiment, in terms of hardware architecture, as shown in FIG. 1, the system 100 includes processor 101. System 100 also includes memory 102 coupled to processor 101, and one or more input/output adapters 103 that may be communicatively coupled via system bus 105. Memory 102 may be operatively coupled to one or more internal or external memory devices via a storage interface 108. Communications adapter 116 may operatively connect the system 100 to one or more networks 106. System bus 105 may connect one or more user interfaces via input/output (I/O) adapter 103. I/O adapter 103 may connect multiple input devices 104 to the system 100. Input devices may include, for example, a keyboard, a mouse, a microphone, a sensor, etc. System bus 105 may also connect one or more output devices 107 via I/O adapter 103. Output device 107 may include, for example, a display, a speaker, or a touchscreen.

Processor 101 is a hardware device for executing hardware instructions or software, particularly that stored in a non-transitory computer-readable memory (e.g., memory 102). Processor 101 can be any custom made or commercially available processor, a central processing unit (CPU), one or more CPUs, for example, CPU 101A-101C, an auxiliary processor among several other processors associated with the system 100, a semiconductor based microprocessor (in the form of a microchip or chip set), or generally any device for executing instructions. Processor 101 can include a cache memory 122, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 122 may be organized as a hierarchy of more cache levels (L1, L2, etc.).

Processor 101 may be disposed in communication with one or more memory devices (e.g., RAM 109, ROM 110, one or more external databases 121, etc.) via a storage interface 108. Storage interface 108 may also connect to one or more memory devices including, without limitation, one or more databases 121, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives may be, for example, a drum, a magnetic disc drive, a magneto-optical drive, an optical drive, a redundant array of independent discs (RAID), a solid-state memory device, a solid-state drive, etc. Variations of memory devices may be used for implementing, for example, a gate model database 121 that stores one or more datasets of models of the gate configurations of various microprocessor designs.

Memory 102 can include random access memory (RAM) 109 and read only memory (ROM) 110. RAM 109 can be any one or combination of volatile memory elements (e.g., DRAM, SRAM, SDRAM, etc.). ROM 110 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Memory 102 may also be a distributed architecture, where various components are situated remote from one another, but can be accessed by processor 101.

The instructions in memory 102 may include one or more separate programs, each of which comprises an ordered listing of computer-executable instructions for implementing logical functions. In the example of FIG. 1, the instructions in memory 102 may include an operating system 111. Operating system 111 can control the execution of other computer programs and provides scheduling, input-output control, file and data management, memory management, and communication control and related services. The instructions in memory 102 may further include application data 112, and a user interface 113.

Memory 102 may also include a layout based ground rule calculation (LBGRC) module 114, configured to receive a set of process assumptions and one or more failure mechanisms and perform layout based ground rule calculation. In certain embodiments, Memory 102 may also include a design layout tool module 115, configured to allow design layout engineers to manually and/or automatically create a design layout or make an adjustment to an existing design layout based on results of the layout based ground rule calculation by the LBGRC module 114.

I/O adapter 103 can be, for example but not limited to, one or more buses or other wired or wireless connections. I/O adapter 103 may have additional elements (which are omitted for simplicity) such as controllers, microprocessors, buffers (caches), drivers, repeaters, and receivers, which may work in concert to enable communications. Further, I/O adapter 103 may facilitate address, control, and/or data connections to enable appropriate communications among the aforementioned components.

I/O adapter 103 can further include a display adapter coupled to one or more displays. I/O adapter 103 may be configured to operatively connect one or more input/output (I/O) devices 107 to the system 100. For example, I/O 103 may connect a keyboard and mouse, a touchscreen, a speaker, a haptic output device, or other output device. Output devices 107 may include but are not limited to a printer, a scanner, and/or the like. Other output devices may also be included, although not shown. Finally, the I/O devices connectable to I/O adapter 103 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, the system 100 may include a mobile communications adapter 123. Mobile communications adapter 123 may include GPS, cellular, mobile, and/or other communications protocols for wireless communication. In some embodiments, the system 100 can further include a communications adapter 116 for coupling to a network 106.

Network 106 can be an IP-based network for communication between the system 100 and any external device. Network 106 transmits and receives data between the system 100 and devices and/or systems external to the system 100. In an exemplary embodiment, network 106 can be a managed IP network administered by a service provider. Network 106 may be a network internal to an aircraft, such as, for example, an avionics network, etc. Network 106 may be implemented in a wireless fashion, e.g., using wireless protocols and technologies, such as WiFi, or WiMax, for example. Network 106 may also be a wired network, e.g., an Ethernet network, an ARINC 429 network, a controller area network (CAN), having any wired connectivity including, e.g., an RS232 connection, R5422 connection. Network 106 can also be a packet-switched network such as a local area network, wide area network, metropolitan area network, Internet network, or other similar type of network environment. The network 106 may be a fixed wireless network, a wireless local area network (LAN), a wireless wide area network (WAN) a personal area network (PAN), a virtual private network (VPN), intranet or other suitable network system.

Network 106 may operatively connect the system 100 to one or more devices including device 120. Network 106 may also connect the system 100 to one or more servers such as, for example, server 119.

If the system 100 is a personal computer, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 110 so that the BIOS can be executed when the system 100 is activated. When the system 100 is in operation, processor 101 may be configured to execute instructions stored within the memory 102, to communicate data to and from the memory 102, and to generally control operations of the system 100 pursuant to the instructions.

According to one or more embodiments of the invention, the system 100 implements the one or more technical solutions described herein, such as be performing a method, and/or executing one or more computer executable instructions stored on computer readable non-transitory storage medium. The design that is finalized using the processes discussed is used to fabricate the physical integrated circuit 130 according to a manufacture process.

Figure 2:
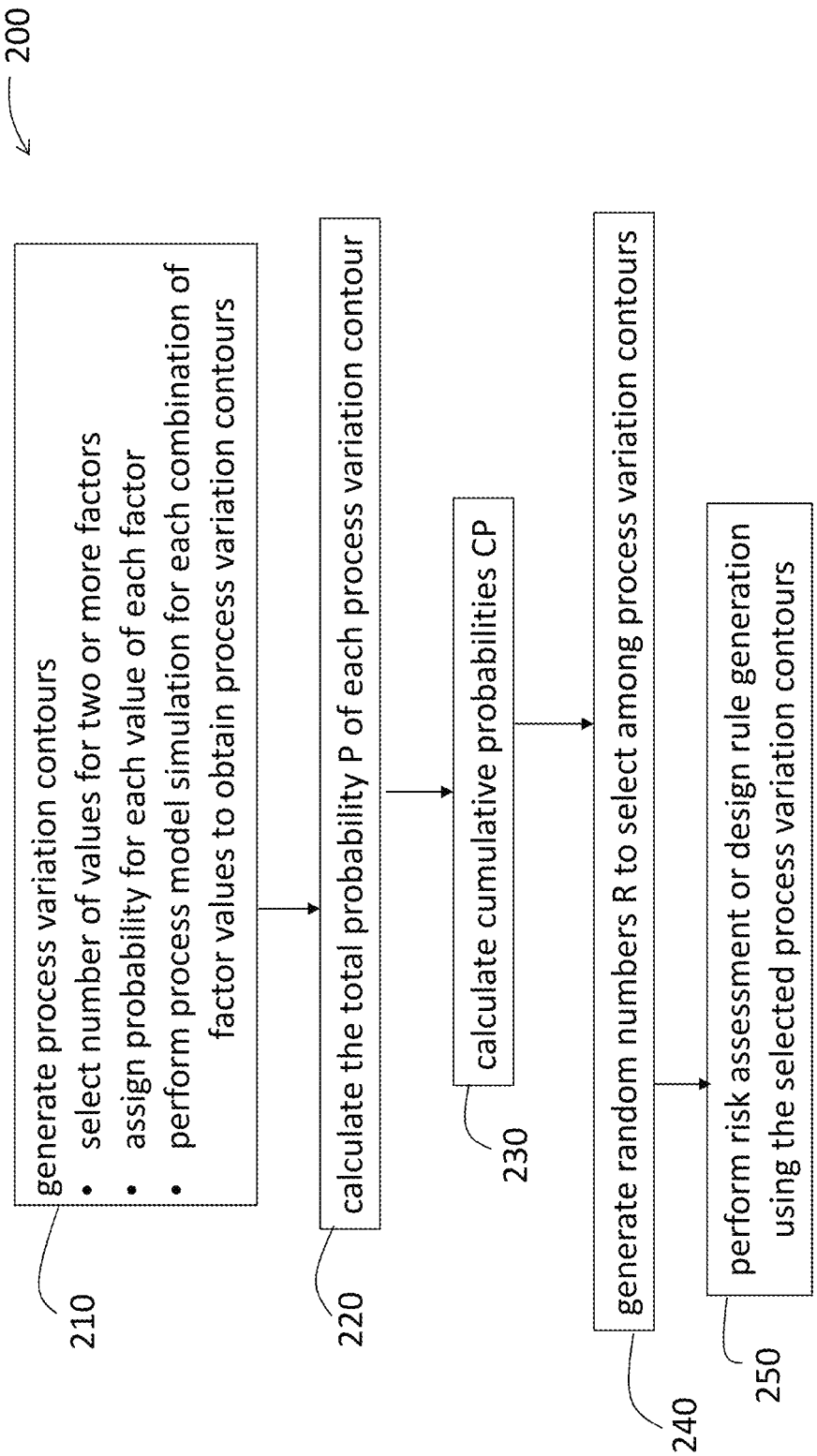
FIG. 2 is a process flow of a method of generating and selecting process variation contours according to one or more embodiments of the invention.

FIG. 2 is a process flow 200 of a method of generating and selecting process variation contours according to one or more embodiments of the invention. The process flow 200 can be performed by the processor 101 and other components of the system 100. As previously noted, the processes shown in FIG. 2 replace the conventional processes of generating process variations using process assumptions and using Monte Carlo simulations to select among the process variations. At block 210, generating the process variation contours involves a series of steps. These steps include selecting a number of values for two or more factors and assigning a probability for each value of each factor. For example, the factors of interest may be focus and dose, and seven focus values (F) and thirteen dose values (D) may be considered with their associated probabilities ($P_F$ and $P_D$, respectively). The values and associated probabilities are based on measurable variations on the photolithography tool. An exemplary set of focus values (F) and corresponding probabilities ($P_F$) are discussed with reference to FIG. 3. Once the set of values and associated probabilities are established for the factors of interest, performing a process model simulation results in process variation contours for different combinations of the factor values. Process model simulation refers to the use of pre-calibrated process models that are generated with measurement data of patterned features on wafers using different factor (e.g., focus, dose, mask bias) values. Each combination of factor values is provided as an input, and the corresponding process model provides the process variation contour. As previously noted, a given process variation contour corresponds with a given layer.

At block 220, calculating the total probability (P) of each process variation contour is based on the probability associated with the value of each factor. For example, if a given process variation contour x is generated by using a focus value (Fx) with a probability ($P_F x$), a dose value (Dx) with a probability ($P_D x$), and a mask bias value (MB) with a probability ($P_{MB} x$), then the corresponding total probability (Px) is given by:

$$Px = P_F x \cdot P_D x \cdot P_{MB} x \qquad \text{[EQ. 1]}$$

At block 230, calculating cumulative probabilities CP refers to successively adding the total probability (P) values of the process variation contours, as detailed with reference to FIG. 4. At block 240, generating random numbers R to select among the process variation contours refers to an iterative process of using Monte Carlo simulations to select a value of R between 0 and 1. For each R value that is generated at each iteration, the process variation contour with an associated CP value that is closest to but also greater than the value of R is selected. At block 250, the process flow 200 includes performing a risk assessment or design rule generation based on the selected process variation contours, at block 240. While risk assessment may be performed at each iteration, design rule generation can commence after the iterations of Monte Carlo simulations, at block 240, are completed. Using the selected process variation contours for subsequent risk assessment or rule determination follows the same steps as the conventional approach.

Risk assessment can involve the selection of process variation contours from two or more layers. For example, process variation contours are selected from two or more layers using the Monte Carlo simulations. A process assumption is then used to obtain an overlay variation that is applied to the two or more process variation contours. Each iteration provides an indication of the risk of failure of the device, and results over a number of iterations provide statistical analysis of risk. The iterations can also be used to develop design rules.

By using the selected process variation contours according to embodiments of the invention, rather than pseudo wafer contours that are determined using process assumptions, and by using the CP values in the selection of process variation contours, the less likely combinations of factor values are selected less often. This is because a process variation contour with a low total probability (P) will have a CP that is not much different than the CP of the previous process variation contour. As a result, not only are two-dimensional variations considered, which is not possible using the conventional process assumption technique, but the more likely scenarios are also considered with greater frequency. The resulting risk assessment or design rule generation is used to fabricate chips with higher yield in the manufacture of the integrated circuit 130.

FIG. 3 is a table 300 showing exemplary factor values and corresponding probabilities according to embodiments of the invention. Specifically, table 300 shows an exemplary set of focus values (F) and corresponding probabilities ($P_F$). In the exemplary table 300, seven focus values (F) are shown. The seven focus values (F) range from −60 to 60 micrometers. The sum of seven probabilities ($P_F$) corresponding with the focus values (F) is 100 percent (%). Similar tables could be shown for other factors of interest. For example, there may be eleven etch bias values with corresponding probabilities, or fifteen dose values with corresponding probabilities. As previously noted, the values and corresponding probabilities are based on variation measurements taken on the photolithography tool. The values can be provided by the tool manufacturer.

FIG. 4 is a table 400 showing n combinations of factor values that result in process variation contours according to embodiments of the invention. Rather than specific values, labels are used to indicate the values and corresponding probabilities. For example, among the n combinations, the $4^{th}$ combination (i.e., the fourth process variation contour) uses focus value f4 with a corresponding probability f4%, dose value d4 and corresponding probability d4%, and mask bias mb4 with a corresponding probability mb4%. These values and probabilities are used in the process model simulation to produce the fourth process variation contour. The labels used for explanatory purposes should not be regarded as indicting unique values. That is, factor values may be part of one or more combinations in table 400. That is, the value of f1 and the value of f4 may be the same, or the value of mb2 may repeat several times as part of different factor value combinations that result in different process variation contours.

As table 400 indicates, each of the n combinations of factor values associated with the n process variation contours has a corresponding total probability P which is the product of the individual probabilities of the factors. For example, for the fourth process variation contour, the total probability P would be a product of f4%, d4%, and mb4%. As table 400 also indicates, the total probability values are successively summed to provide cumulative probability CP values. For the first entry, P and CP are the same (0.01). For the second entry, P=0.05, thus, CP is the previous CP value (0.01) summed with the new P value (0.05) or, as indicated, 0.06. The CP value (1.06) for the third entry is the CP value (0.06) of the second entry with the P value (1) of the third entry added. As table 400 indicates, the final CP value, for the nth entry in the exemplary case, is 100. As previously noted, R is randomly generated as a value between 0 and 1, and the CP value closest to and less than the R value is used to select the corresponding process variation contour.

Figure 5:
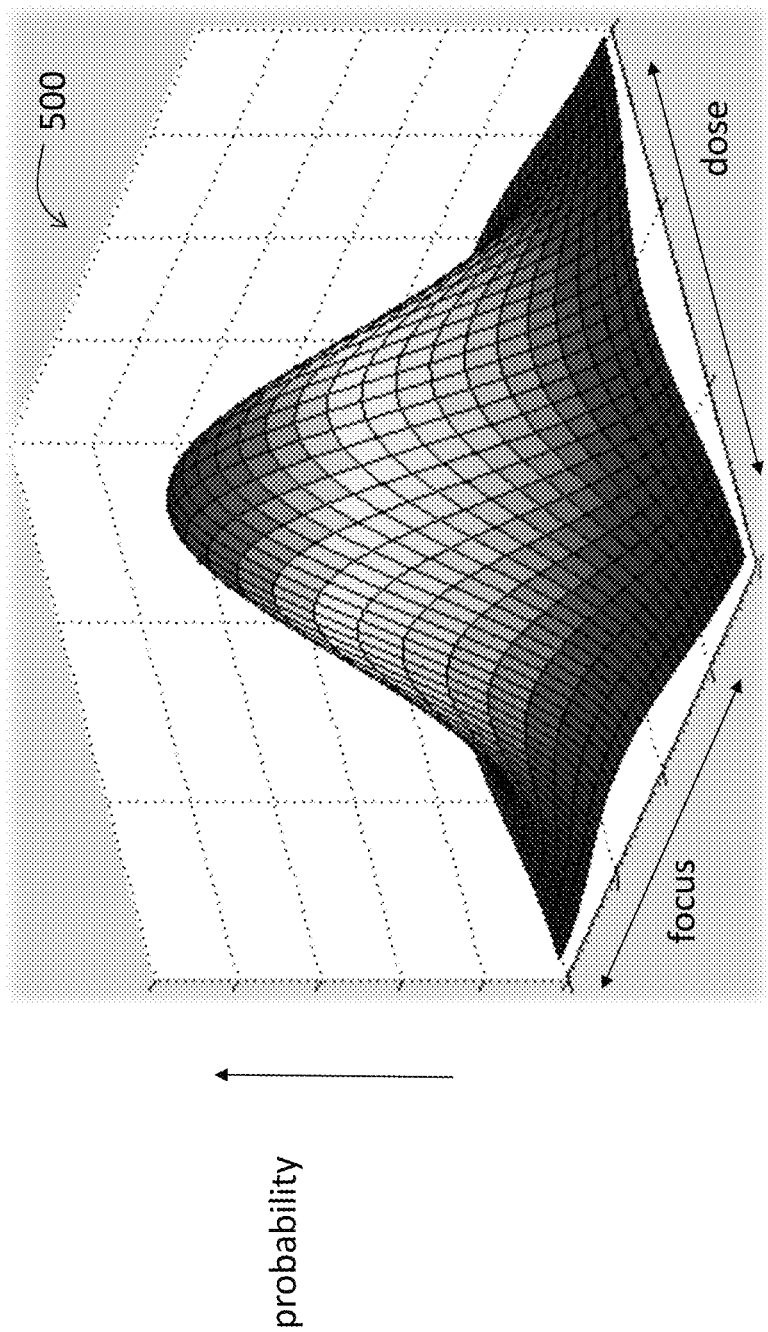
FIG. 5 shows the probability distribution shape for print quality on a wafer for a distribution of factor values according to one or more embodiments of the invention.
Figure 6:
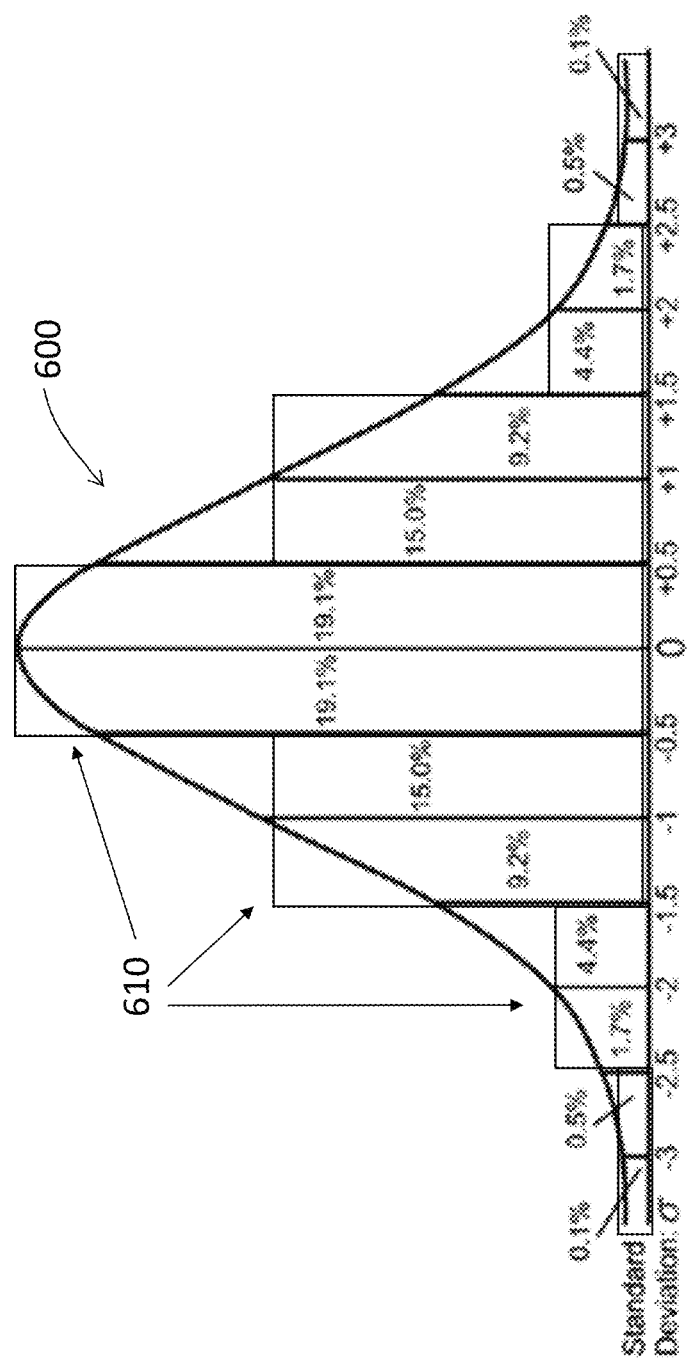
FIG. 6 shows the normal distribution of focus values that are used in accordance with embodiments of the invention.
Figure 7:
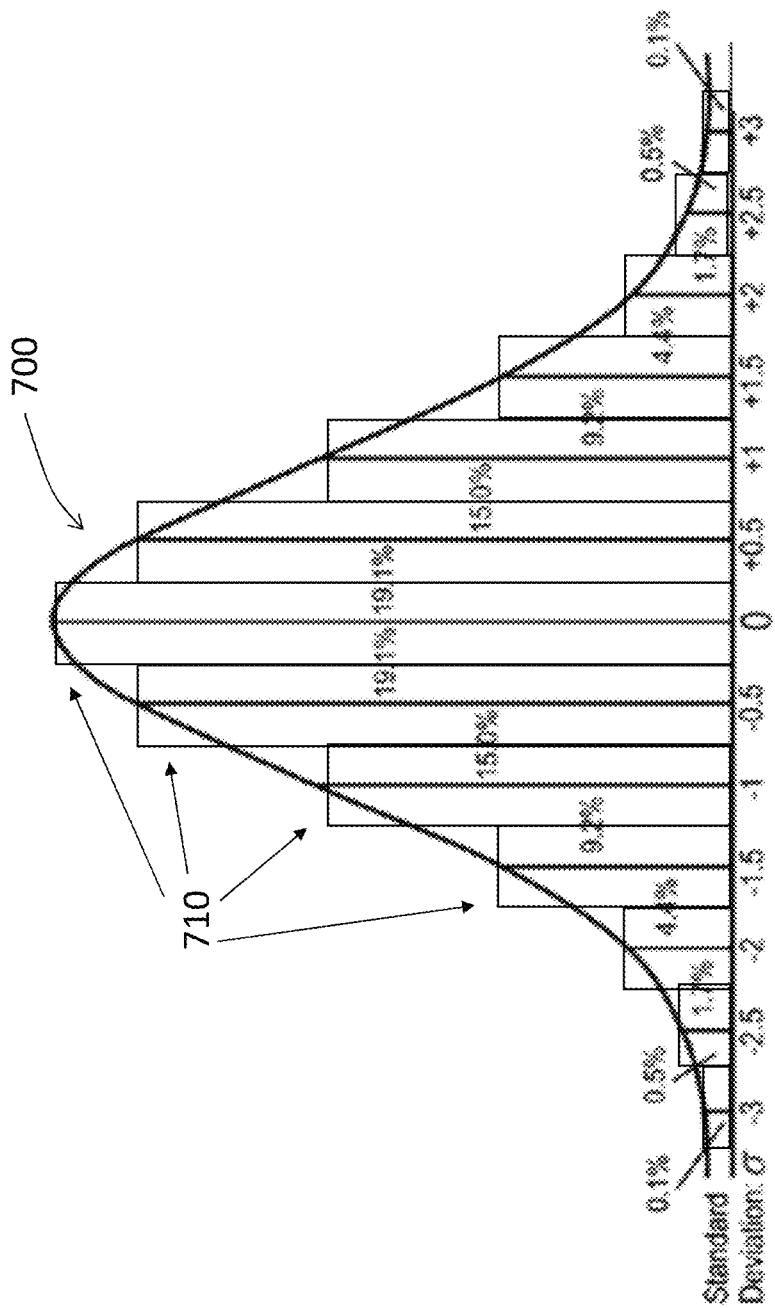
FIG. 7 shows the normal distribution of dose values that are used in accordance with embodiments of the invention.

FIGS. 5-7 illustrate an example of considering the probability associated with each factor value according to embodiments of the invention. FIG. 5 shows the probability distribution shape 500 for print quality on a wafer for a distribution of focus and dose values according to one or more embodiments of the invention. The probability distribution shape 500 follows a three-dimensional Gaussian distribution. The values of the focus and dose follow a normal distribution and the nominal values of each are in the center. When both the focus and the dose are at their respective nominal values (i.e., corresponding with the center of the probability distribution shape 500), the print quality on the wafer is best. As the probability distribution shape 500 indicates, this is also the most likely scenario (i.e., probability is highest in the center of the probability distribution shape 500).

When both the focus and the dose are farthest from their nominal values (i.e., corresponding with the corners of the probability distribution shape 500), the print quality is lowest. As the probability distribution shape 500 indicates, this is also the least likely scenario (i.e., probability is lowest at the corners of the probability distribution shape 500). The probability distribution shape 500 indicates that the worst-case scenario (i.e., focus and dose are both farthest from their nominal value) is much less probable than the best-case scenario (i.e., focus and dose are both at their nominal value). Thus, if the worst-case scenario is considered relatively more often than the best-case scenario, then this low-probability scenario will likely lead to higher-than-realistic failure estimates and more-conservative-than-necessary design rules. This clarifies the advantage of the approach detailed in FIG. 2, which ensures that the probability of a combination of factor values is properly considered.

FIG. 6 shows the normal distribution of focus values 600 that are used in accordance with embodiments of the invention. The nominal value is in the center (i.e., at 0) and, as the normal distribution of focus values 600 indicates, this nominal value has the highest probability (19.1%). The nominal value may correspond with a focus value of 10 nanometers, for example. As FIG. 6 indicates, standard deviation from −4 sigma (σ) to +4σ is divided into seven discretized ranges 610. The number of ranges 610 is selected based on the desired resolution in the process variation contours that are ultimately generated. The focus value associated with the center of each range 610 and the probability associated with each range 610 may be used to generate process variation contours, much like the values and associated probabilities shown in table 300.

FIG. 7 shows the normal distribution of dose values 700 that are used in accordance with embodiments of the invention. As in FIG. 6, the nominal value is in the center (i.e., at 0) and, as the normal distribution of dose values 700 indicates, this nominal value has the highest probability (19.1%). The nominal value may be $4 \times 10^{12}$/square-centimeters at 25 kilo Volts of energy, for example. As FIG. 7 indicates, standard deviation from −4σ to +4σ is divided into thirteen discretized ranges 710. The number of ranges 710 is selected based on the desired resolution in the process variation contours that are ultimately generated. The dose value associated with the center of each range 710 and the probability associated with each range 710 may be used to generate process variation contours.

Figure 8:
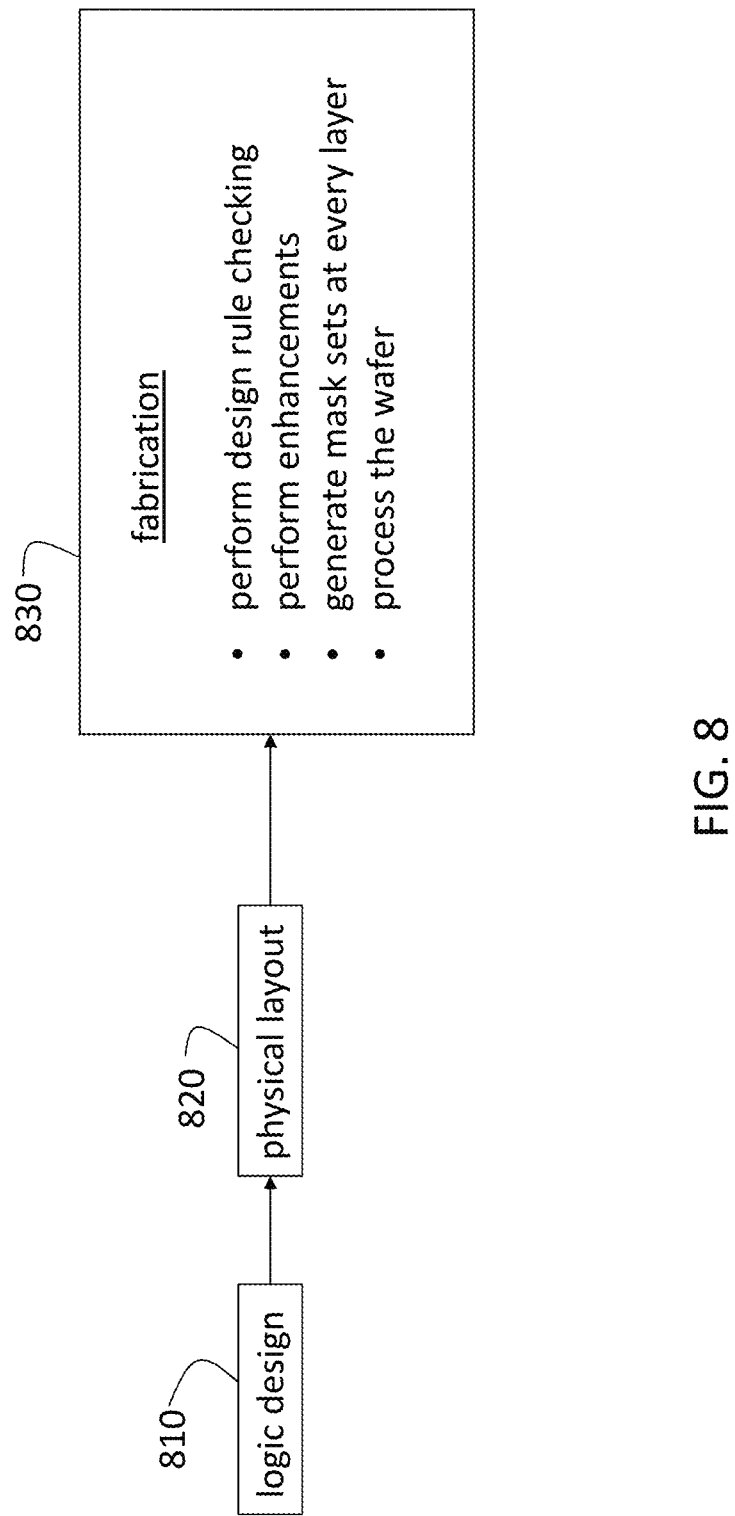
FIG. 8 is a process flow of a method of fabricating an integrated circuit based on incorporation of process variation contours in design rule and risk estimation determination according to embodiments of the invention.

FIG. 8 is a process flow of a method of fabricating an integrated circuit 130 based on incorporation of process variation contours in design rule and risk estimation determination according to embodiments of the invention. At block 810, performing the logic design involves known iterative processes to determine the components required to achieve the objectives of the design. At block 820, performing physical layout involves processes that include the generation and selection of process variation contours that take into account the probability of each factor that contributes to the process variation contour according to embodiments of the invention. Once the physical layout is finalized and tapeout is performed, the foundry fabricates the integrated circuit 130 according to the processes at block 830.

At block 830, the process of fabricating the integrated circuit 130 involves performing the DRC to ensure that the design rules established using the process variation contours are met. Performing enhancements includes performing optical proximity correction (OPC), for example. OPC is a known photolithography enhancement technique to compensate for image errors caused by diffraction or process effects. Generating mask sets at every layer is then followed by processing the wafer in the sequence of the mask order. The processing of the wafer includes photolithography and etch. Because the process variation contours are used, in accordance with embodiments of the invention, in the finalization of the physical layout, the fabrication yield that is ultimately achieved is improved over using pseudo wafer contours, for example.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer-implemented method to perform risk assessment or design rule determination for an integrated circuit, the method comprising:

generating, using a processor, two or more process variation contours based on corresponding two or more combinations of two or more factors that affect manufacturability of the integrated circuit, wherein each of the two or more process variation contours is associated with a probability;

generating, using the processor, a random number to select from among the two or more process variation contours based on a cumulative probability value associated with each of the two or more process variation contours, wherein the cumulative probability values are determined from the probabilities, and the generating the random number includes generating a number between 0 and 1, corresponding with a percentage between 0 and 100, using a Monte Carlo simulation;

selecting from among the two or more process variation contours based on the random number includes selecting one of the two or more process variation contours with the associated cumulative probability that is closest to but less than the random number; and performing the risk assessment or the design rule determination using selected ones of the two or more process variation contours.

2. The computer-implemented method according to claim 1, further comprising obtaining two or more values and corresponding two or more value probabilities for each of the two or more factors.

3. The computer-implemented method according to claim 2, wherein a first number of the two or more values and the first number of the corresponding two or more value probabilities for one of the two or more factors is different than a second number of the two or more values and the second number of the corresponding two or more value probabilities for another of the two or more factors.

4. The computer-implemented method according to claim 2, further comprising generating each of the two or more combinations of the two or more factors using one of the two or more values of each of the two or more factors.

5. The computer-implemented method according to claim 4, wherein the probability associated with each of the two or more process variation contours is a product of the value probabilities corresponding with the one of the two or more values of each of the two or more factors.

6. The computer-implemented method according to claim 1, wherein, for a set of the two or more process variation contours, determining the cumulative probability value associated with a given one of the two or more process variation contours includes obtaining a sum of the probability associated with the given one of the two or more process variation contours and the probability associated with each previous one of the two or more process variation contours, and the cumulative probability value associated with a last one of the two or more process variation contours in the set is 100 percent.

7. The computer-implemented method according to claim 1, further comprising fabricating the integrated circuit.

8. A system to perform risk assessment or design rule determination for an integrated circuit, the system comprising:
 a memory device; and
 a processor configured to:
  generate two or more process variation contours based on corresponding two or more combinations of two or more factors that affect manufacturability of the integrated circuit, wherein each of the two or more process variation contours is associated with a probability;
  generate a random number to select from among the two or more process variation contours based on a cumulative probability value associated with each of the two or more process variation contours, wherein the cumulative probability values are determined from the probabilities, and the processor is configured to generate the random number by generating a number between 0 and 1, corresponding with a percentage between 0 and 100, using a Monte Carlo simulation;
  select from among the two or more process variation contours using the random number based on selecting one of the two or more process variation contours with the associated cumulative probability that is closest to but less than the random number; and
  perform the risk assessment or the design rule determination using selected ones of the two or more process variation contours.

9. The system according to claim 8, wherein the processor is further configured to obtain two or more values and corresponding two or more value probabilities for each of the two or more factors.

10. The system according to claim 9, wherein a first number of the two or more values and the first number of the corresponding two or more value probabilities for one of the two or more factors is different than a second number of the two or more values and the second number of the corresponding two or more value probabilities for another of the two or more factors.

11. The system according to claim 9, wherein the processor is further configured to generate each of the two or more combinations of the two or more factors using one of the two or more values of each of the two or more factors, and the probability associated with each of the two or more process variation contours is a product of the value probabilities corresponding with the one of the two or more values of each of the two or more factors.

12. The system according to claim 8, wherein, for a set of the two or more process variation contours, the processor is configured to determine the cumulative probability value associated with a given one of the two or more process variation contours based on obtaining a sum of the probability associated with the given one of the two or more process variation contours and the probability associated with each previous one of the two or more process variation contours, and the cumulative probability value associated with a last one of the two or more process variation contours in the set is 100 percent.

13. A computer program product for performing risk assessment or design rule determination for an integrated circuit, the computer program product comprising a non-transitory computer readable storage medium having program instructions embodied therewith, the program instructions executable by a processor to perform a method comprising:
 generating two or more process variation contours based on corresponding two or more combinations of two or more factors that affect manufacturability of the integrated circuit, wherein each of the two or more process variation contours is associated with a probability;
 generating a random number to select from among the two or more process variation contours based on a cumulative probability value associated with each of the two or more process variation contours, wherein the cumulative probability values are determined from the probabilities, and the generating the random number includes generating a number between 0 and 1, corresponding with a percentage between 0 and 100, using a Monte Carlo simulation;
 selecting from among the two or more process variation contours is based on the random number includes selecting one of the two or more process variation contours with the associated cumulative probability that is closest to but less than the random number; and
 performing the risk assessment or the design rule determination using selected ones of the two or more process variation contours.

14. The computer program product according to claim 13, further comprising obtaining two or more values and corresponding two or more value probabilities for each of the two or more factors.

15. The computer program product according to claim 14, wherein a first number of the two or more values and the first number of the corresponding two or more value probabilities for one of the two or more factors is different than a second number of the two or more values and the second number of the corresponding two or more value probabilities for another of the two or more factors.

16. The computer program product according to claim 14, further comprising generating each of the two or more combinations of the two or more factors using one of the two or more values of each of the two or more factors, wherein the probability associated with each of the two or more process variation contours is a product of the value probabilities corresponding with the one of the two or more values of each of the two or more factors.

17. The computer program product according to claim 13, wherein, for a set of the two or more process variation contours, determining the cumulative probability value associated with a given one of the two or more process variation contours includes obtaining a sum of the probability associated with the given one of the two or more process variation contours and the probability associated with each previous one of the two or more process variation contours, and the cumulative probability value associated with a last one of the two or more process variation contours in the set is 100 percent.

* * * * *